Patented Mar. 7, 1950

2,499,827

UNITED STATES PATENT OFFICE 2,499,827

WELDING ELECTRODE FOR CAST IRON

Theodore Ephraim Kihlgren, Scotch Plains, N. J., assignor to The International Nickel Company, Inc., New York, N. Y., a corporation of Delaware No Drawing. Application February 28, 1947, Serial No. 731,705

8 Claims. (Cl. 219—8)

The present invention relates to an arc welding electrode adapted for use with both A. C. and D. C. welding procedures and equipment and it relates more particularly to an arc welding electrode for producing weld deposits having a high resistance to fusion-line and weld cracking and particularly such weld deposits on cast iron.

In my earlier co-pending application, Serial No. 654,809, filed March 15, 1946, now Patent No. 2,444,564, dated July 6, 1948, of which this application is a continuation-in-part, I have shown that welds on cast iron, when made with a coated welding electrode having a core wire of substantially pure nickel, are generally devoid of cracks when examined both during welding and in polished and etched sections after completion of welding.

I have now discovered that an electrode for welding cast iron having a core wire consisting essentially of nickel and iron presents the advantages of increased resistance to fusion-line and weld cracking and is particularly adapted for use in the repair and fabrication of cast iron parts even under such severe welding conditions as welding without preheat or peening.

This adaptability for producing welds free of either weld or fusion line cracking without preheat or peening is particularly useful when welding heavy sections or rigid structures which because of their size, shape or disposition are not adaptable to preheating and peening. The method of the present invention thus provides a major improvement in the welding art.

It is an object of the present invention to provide a welding electrode particularly adapted for welding cast iron.

It is another object of the present invention to provide cast iron welded joints substantially devoid of cracks.

A further object of the present invention is the provision of a weld deposit devoid of cracks both in the fusion line of the weld deposit and the basis metal and in the weld deposit itself.

A still further object of the present invention is the production of machinable weld deposits on iron castings without the need for preheating or peening.

Other objects and advantages of the present invention will become apparent from the following description.

Stated broadly, the present invention provides an arc welding electrode comprising a core wire containing from about 40% to about 75% nickel and the balance iron together with minor amounts of deoxidizers and impurities such as carbon, manganese, silicon, copper, titanium and magnesium, and a dextrine bonded flux coating enclosing said core wire.

As stated, the nickel content of the core wire for the electrode of the present invention is within the range of 40–75%. It is preferred that the nickel content of the core wire should not fall substantially below 40% since plate dilution in the fusion metal may then lower the nickel content to a level too low to obtain the crack-free weld deposits of the present invention. The possible causes and effects of plate dilution are discussed hereinafter and it is also a preferred feature of the present invention that the weld deposit produced by fusion of the electrode shall have a nickel content not lower than about 35% after any plate dilution that may occur. The iron content is within the range of 60–25%. Preferably, the core wire is about 60% nickel and about 40% iron. In preparing the core wire, the melt is preferably subjected to a suitable deoxidation treatment which involves, for example, the addition of about 0.4% manganese, 0.15% silicon and 0.05% calcium. The material so treated exhibits good forgeability and possesses good hot and cold working properties. It will be appreciated by those skilled in the art that the deoxidation treatment may be varied somewhat from the above depending on the method used for preparing the heat and on other factors.

The flux coating for enclosing the core wire in the electrode of the present invention is substantially the same as the flux coating used in my aforesaid co-pending application. It preferably comprises slag-forming ingredients such as carbonates and fluorides of alkaline earth metals, preferably calcium; titanium, preferably in the form of a ferro-titanium alloy; carbon, at least a portion of which is preferably in the form of natural graphite; iron, in the form of iron powder; a colloidal clay, preferably bentonite, and a binder.

The range and the preferred composition of the flux ingredients are shown in Table 1.

Table 1

| Dry Ingredients | Preferred | Range |
|---|---|---|
| | Parts | Parts |
| Calcium carbonate | 32 | 25–50 |
| Calcium fluoride | 29 | 20–35 |
| Iron powder | 15 | 0–30 |
| Carbon | 15 | 10–30 |
| Ferro-25 titanium | 5 | 1–10 |
| Bentonite | 4 | 3–6 |

As a binder for the foregoing dry ingredients a composition within the following range may be used.

| Binder | Preferred | Range |
|---|---|---|
| | Parts | Parts |
| A { Dextrine | 5 | 0.5–6 |
| { Water | 12 | 12–15 |
| B Sodium silicate | | 0–4 |

The water and dextrine (A) are mixed at 180° F. to 200° F. for about 15 minutes. The sodium silicate (B) is added to the (A) mixture just before adding the resultant mixture to the dry ingredients.

Variation may be made in the foregoing dry ingredients and binder ingredients without departing from the spirit and scope of the present invention. For example, iron powder is preferably included for its beneficial effects on electrode "burn off" characteristics but is not an essential ingredient in obtaining the beneficial results of the present invention. The primary purpose in adding sodium silicate to the binder solution is to inhibit reaction between the dextrine binder and the iron powder. Thus, when iron powder is eliminated as a dry flux ingredient, the sodium silicate may also be eliminated. Sodium carbonate or other alkaline salts may be substituted in suitable quantities for the sodium silicate with similar inhibiting results. The carbon used may be added entirely as manufactured carbon of about 200 mesh size but I prefer that about 5% of all the carbon be added in the form of natural graphite which improves the extrudability of the flux. When the ferro-titanium is added in other form than the ferro-25 titanium alloy, for example, as ferro-40 titanium, the amount added is proportionately reduced to maintain the titanium addition within the range given.

The flux is applied to the core wire by the extrusion process and the core wire diameter-flux thickness relationship may be those described in detail in my aforesaid co-pending application.

The carbon introduced into the fusion through the coating has an important metallurgical effect upon the deposit. The carbon absorbed by the molten weld is rejected as graphitic carbon in a way to favorably affect the distribution of shrinkage and to reduce solidification shrinkage stresses and thus decrease weld cracking tendencies. Weld deposits made with the electrode of the present invention customarily show a content of the order of 1% to 1.25% graphitic carbon analysis. The weld structure is then essentially a nickel-iron (austenitic) matrix with graphite carbon. In the welding art, a welded deposit is inevitably effected, to at least some extent, by plate dilution. Thus, in welding cast iron with a nickel-containing electrode, the weld deposit will be lower in nickel than is the electrode core in each case due largely to plate dilution and, in some instances, to iron pick-up from the flux coating. To illustrate this effect, if welded deposits are made on cast iron using electrodes having a core wire of approximately 60% nickel and 40% iron, the preferred core wire of the present invention, and assuming a dilution of 15%, the nickel content of the welded deposit produced will, despite the plate dilution, be well above the minimum 35% desired in the weld deposit and even if dilutions as high as 30% were encountered when using the preferred electrode core wire of the present invention, the nickel content of the fusion would be about 42% and it will be apparent that the nickel content thus remains above the 35% in the weld deposit.

Such factors as geometry and design of joint, heat input, and electrode penetration characteristics all are of influence in the extent of dilution and it will be apparent that these factors all require careful consideration in determining the minimum permissible nickel content in the electrode for a given application. As has been pointed out hereinbefore, a dilution as high as 30% would not detrimentally affect a weld deposit produced according to the present invention with the prefered 60% nickel-iron electrode of the present invention.

As stated hereinbefore, the geometry and design of the joint and the heat input and electrode penetration characteristics are factors which influence the extent of dilution in a weld deposit. In weld deposits, for example such as those in which the fusion metal is deposited into or upon a V-groove in the basis metal, it will be apparent that heat input will be greater, comparatively, in the area of the basis metal involved, when the basis metal is relatively thin in cross section and consequently the dilution will be greater than would be the case when the basis metal is relatively thick in cross section. Hence, where a high dilution is to be expected or is inevitable, the nickel-iron alloy chosen for the core wire electrode will be one which is relatively high in nickel content and which will, with said high dilution, produce a weld deposit of a nickel-iron alloy in which the nickel content is not below about 35%. Conversely, where dilution can be maintained at a minimum, for example in the upper beads of a relatively wide V-groove, the nickel-iron alloy chosen for the core wire of the electrode will be one having a nickel content only slightly higher than the nickel content which is desirable in the welded deposit.

It will be appreciated from the foregoing discussion, that the present invention in its broad aspect contemplates the production of a weld deposit on cast iron in which the fusion metal deposited is a nickel-iron alloy which, with plate dilution from the parts being welded, is a nickel-iron alloy having a residual nickel content of about 35% or more.

A further advantage lies in the applicability of the electrode and the method of the present invention to the welding of high alloy irons such as those sold under the trade-mark "Ni-Resist."

The electrode of the present invention is also particularly applicable to the welding of grey cast iron of high phosphorus content, for example iron containing about 3.50% total carbon, 2.25% silicon and 0.40% phosphorus, with normal amounts of manganese, sulphur, etc.

A useful test for the evaluation of electrodes for the welding of cast iron is the U-groove block welding test. The test specimen is a cast iron block 3"x 5"x 1" with a U-groove about 3½" long, ¾" wide and ⅜" deep on the top surface. The groove is filled up by arc welding, using various conditions of preheat and peening, the most severe condition being that of no preheat and no peening.

In the following illustrative examples, the U-groove welding test procedure just described was used. All welds were examined both during welding and in polished and etched sections after completion of the weld.

EXAMPLE 1

A welding electrode was made up with a core wire containing 49.5% nickel with the balance substantially iron plus minor proportions of manganese, silicon and other impurities and/or deoxidizers. Said core wire was coated by extrusion with a flux coating of the preferred composition of Table 1. The electrode was deposited by arc welding in a U-groove in a grey iron block, without preheat and without peening. No cracking, either in the heat affected zone of the cast iron block or in the weld metal could be detected.

EXAMPLE 2

The following welds were made without preheat and without peening on U-groove blocks of the following compositions: 3.33% total carbon, 2.26% silicon, 0.60% manganese, 1.1% nickel, 0.08% phosphorus, 0.17% sulfur and balance iron. The core wires used, all of which were coated with a flux of the composition of Table 1, were nickel-iron alloys of the following compositions:

| Core Wire | Percent Ni | Percent Fe | Remarks |
|---|---|---|---|
| A | 27.05 | 71.91 | (1) |
| B | 37.75 | 61.48 | (1) |
| C | 48.22 | 51.15 | (1) |
| D | 2 49.50 | 2 50.20 | (1) |

1 Plus normal amounts of Mn, Si, etc.
2 Approximate.

Approximately 7 beads were deposited to fill in the U-grooves, the welds being examined after each pass. The results are given in Table 2.

Table 2

| Core Wire | Examination of Weld |
|---|---|
| A | no weld cracks, fusion line crack after 5th pass. |
| B | no cracking. |
| C | Do. |
| D | Do. |

EXAMPLE 3

A further series of U-groove block welding tests was made under the same conditions as those recited in Example 2. The blocks used were of the following composition: 3.27% total carbon, 2.18% silicon, 0.63% manganese, 1.1% nickel, 0.08% phosphorus, 0.16% sulfur and balance iron. The core wires used were of the following composition:

| Core Wire | Percent Ni | Percent Fe |
|---|---|---|
| E | 50 | balance.1 |
| F | 60 | Do.1 |
| G | 80 | Do.1 |

1 Plus usual amounts of Mn, Si, etc.

The results of the examination of the welds made are shown in Table 3.

Table 3

| Core Wire | Examination of Weld |
|---|---|
| E | No cracking. |
| F | Do. |
| G | No cracking observed during weld, slight fusion line cracking detected on sectioning. |

EXAMPLE 4

In order to observe the applicability of the nickel-iron electrode of the present invention to the welding of special iron, riser sections about 2½" in diameter were grooved out to simulate the U-groove black test, using the following base metals:

1. Nickel-copper-chromium-cast iron (14% Ni, 6% Cu, 2% Cr, 2.8% C, 2% Si, 1% Mn)
2. 30% Nickel-chromium-cast iron (30% Ni, 0% Cu, 3% Cr, 2.4% C, 1.5% Si, 1% Mn)

The core wire used was a 50% nickel-iron alloy containing the usual minor amounts of deoxidizers and impurities. The flux coating and the welding conditions were the same as those used in Examples 2 and 3. No cracking was detected either during welding or upon sectioning.

It will be apparent from the foregoing illustrative examples that the novel welding electrodes of the present invention are particularly adapted for making welded joints on cast iron or special iron parts under such severe welding conditions as those in which there is no preheating of the parts to be joined and no peening of the weld deposit, which welded joint is devoid of fusion line and weld cracking. The invention is hence particularly useful in repairing or building up massive parts of cast iron which parts because of their mass could be preheated only with great difficulty, if at all.

While the mechanism by which the welded deposit is rendered free of cracks is not thoroughly understood, it is believed to be due partly to the advantageous distribution and reduction of shrinkage stresses and partly due to a lowered coefficient of expansion in the weld deposit. Whatever this mechanism may be, however, the results obtained, based on a large number of experiments, have produced fusion deposited welds devoid of cracks both throughout the welded metal itself and in the fusion line of said weld metal and the basis metal.

Although the present invention has been described in connection with certain specific embodiments thereof it is to be understood that variations and modifications in composition and proportions of ingredients may be made without departing from the spirit and scope of the invention as set forth in the appended claims.

I claim:

1. An arc welding electrode adapted for producing crack-free weld deposits on high phosphorus cast irons comprising a core wire containing from about 40% to about 75% nickel and the balance mainly iron, and a flux coating enclosing said core wire; said flux coating containing about 10 parts to 30 parts carbon, about 0.25 part to 2.5 parts titanium in the form of an alloy, iron powder ranging up to 30 parts, from 45 parts to about 85 parts slag-forming materials, and a binder therefor.

2. An arc welding electrode adapted for producing weld deposits devoid of fusion line and weld cracking on high phosphorus cast irons comprising a core wire containing from about 40% to about 75% nickel and the balance mainly iron, and a flux coating containing about 10 parts to about 30 parts carbon at least a portion of which is present in the form of natural graphite, about 1.25 parts titanium in the form of a ferro-titanium alloy, an amount of iron powder ranging up to about 30 parts, from about 45 parts to about 85 parts slag-forming materials and a dextrine binder therefor.

3. An arc welding electrode adapted for producing weld deposits devoid of fusion-line cracking and weld cracking on cast irons comprising a core wire containing about 60% nickel and about 40% iron, and a flux coating enclosing said core wire; said flux coating containing about 15 parts carbon, about 5 parts ferro-titanium, about 15 parts iron powder, about 32 parts calcium carbonate, about 29 parts calcium fluoride, about 4 parts bentonite, and a dextrine-water-sodium silicate binder in proportions adapted to impart extrudability to said flux coating.

4. An arc welding electrode adapted for producing weld deposits devoid of fusion-line cracking and weld cracking on cast irons comprising a core wire containing from about 40% to about 75% nickel and the balance mainly iron, and a flux coating enclosing said core wire; said flux coating containing about 45 parts to 85 parts slag-forming materials, up to 30 parts iron powder, about 10 parts to about 30 parts carbon, about 0.25 part to about 2.5 parts titanium in the form of an alloy, about 3 parts to about 6 parts bentonite, and a dextrine-water binder in proportions adapted to impart extrudability to said flux coating.

5. A weld deposit of a welding element on cast iron comprising a fusion-deposited overlay of a nickel-iron alloy containing from about 35% to about 75% nickel and having a graphitic carbon content of from about 1.0% to 1.25%, said deposit being characterized by a freedom from cracks throughout the weld deposit and throughout the fusion line between said deposit and said cast iron.

6. A weld deposit of a welding element on cast iron comprising a fusion-deposited overlay of a nickel-iron alloy containing between about 35% to about 50% nickel and having a graphitic carbon content of from about 1.0% to 1.25% and the balance mainly iron, said deposit being characterized by a freedom from cracks throughout said weld deposit and throughout the fusion line between said deposit and said cast iron.

7. A weld deposit of a welding element on cast iron comprising a fusion deposit uniting adjacent parts of said cast iron, said deposit consisting of about 40% nickel and having a graphitic carbon content of from 1.0% to 1.25% and the balance mainly iron and being characterized by a freedom from cracks throughout said weld deposit and the fusion line between said deposit and said parts.

8. An arc welding electrode adapted for producing crack-free weld deposits on cast irons comprising a core wire containing from about 55% to about 75% nickel and the balance mainly iron, and a flux coating enclosing said core wire; said flux coating containing by weight about 10 parts to 30 parts carbon, about 0.25 part to 2.5 parts titanium in the form of an alloy, iron powder ranging up to 30 parts, from 45 parts to about 85 parts slag-forming materials, and a binder therefor.

THEODORE EPHRAIM KIHLGREN.

REFERENCES CITED

The following references are of record in the file of this patent:

UNITED STATES PATENTS

| Number | Name | Date |
|---|---|---|
| 1,632,704 | Jacobs | June 14, 1927 |
| 1,794,983 | Ritter | Mar. 3, 1931 |
| 2,303,746 | Kihlgren et al. | Dec. 1, 1942 |
| 2,315,740 | Schoonmaker | Apr. 6, 1943 |
| 2,444,654 | Kihlgren | July 6, 1948 |

Certificate of Correction

Patent No. 2,499,827 March 7, 1950

THEODORE EPHRAIM KIHLGREN

It is hereby certified that error appears in the printed specification of the above numbered patent requiring correction as follows:

Column 1, line 10, for the patent number "2,444,564" read *2,444,654*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*